(12) United States Patent
Lindner et al.

(10) Patent No.: US 12,204,704 B2
(45) Date of Patent: Jan. 21, 2025

(54) OPERATING UNIT OF A VEHICLE

(71) Applicant: Bayerische Motoren Werke Aktiengesellschaft, Munich (DE)

(72) Inventors: Matthias Lindner, Graefelfing (DE); Maximilian Prex, Gerzen (DE); Daniel Wiedemann, Wolfratshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 825 days.

(21) Appl. No.: 17/257,369

(22) PCT Filed: Jul. 2, 2019

(86) PCT No.: PCT/EP2019/067738
§ 371 (c)(1),
(2) Date: Dec. 31, 2020

(87) PCT Pub. No.: WO2020/007862
PCT Pub. Date: Jan. 9, 2020

(65) Prior Publication Data
US 2021/0132713 A1    May 6, 2021

(30) Foreign Application Priority Data
Jul. 4, 2018   (DE) ...................... 10 2018 211 019.0

(51) Int. Cl.
*G06F 3/0354*   (2013.01)
*B60K 35/00*   (2024.01)
*B60K 35/10*   (2024.01)

(52) U.S. Cl.
CPC .......... *G06F 3/03547* (2013.01); *B60K 35/00* (2013.01); *B60K 35/10* (2024.01); *B60K 2360/1434* (2024.01)

(58) Field of Classification Search
CPC .............. G06F 3/03547; G06F 3/0443; G06F 3/04883; G06F 3/0446; G06F 2203/04105;
(Continued)

(56) References Cited

U.S. PATENT DOCUMENTS

2010/0179725 A1    7/2010  Boote et al.
2012/0247937 A1   10/2012  Saito et al.
(Continued)

FOREIGN PATENT DOCUMENTS

CN    104422977 A    3/2015
CN    105204701 A   12/2015
(Continued)

OTHER PUBLICATIONS

International Search Report (PCT/ISA/210) issued in PCT Application No. PCT/EP2019/067738 dated Oct. 22, 2019 with English translation (six (6) pages).
(Continued)

*Primary Examiner* — Deeprose Subedi
(74) *Attorney, Agent, or Firm* — Crowell & Moring LLP

(57) ABSTRACT

Please substitute the new Abstract submitted herewith for the original Abstract: An operating unit of a vehicle includes an operating element. The operating element includes a glass body, a touch sensitive input layer, an electrically nonconductive intermediate layer, and a base. The glass body has an upper side which forms a visible and touchable surface of the operating element, and a lower side opposite the upper side. The touch-sensitive input layer is on the lower side of the glass body and is configured to detect a touch on the upper side of the glass body. The electrically nonconductive intermediate layer is located between the lower side of the glass body and the input layer. The operating element is mounted on the base.

12 Claims, 1 Drawing Sheet

(58) Field of Classification Search
CPC ............ G06F 2203/04101; G06F 2203/04103; G06F 2203/0339; G06F 3/044; B60K 37/06; B60K 35/00; B60K 2370/1434; B60K 2370/146; B60K 2370/1468; B60K 2370/143; B60R 11/0264
See application file for complete search history.

(56) References Cited

U.S. PATENT DOCUMENTS

| | | |
|---|---|---|
| 2015/0062709 A1 | 3/2015 | Matsuyuki et al. |
| 2015/0165965 A1 | 6/2015 | Masaki et al. |
| 2017/0024022 A1 | 1/2017 | Upmanue et al. |
| 2017/0147106 A1* | 5/2017 | Kwon .................... B60K 37/06 |
| 2019/0155447 A1 | 5/2019 | Wiedemann et al. |

FOREIGN PATENT DOCUMENTS

| | | |
|---|---|---|
| CN | 107037910 A | 8/2017 |
| DE | 10 2010 042 709 A1 | 2/2012 |
| EP | 3 264 242 A1 | 1/2018 |
| JP | 2014-229223 A | 12/2014 |
| WO | WO 2018/019520 A1 | 2/2018 |

OTHER PUBLICATIONS

English translation of Chinese-language Office Action issued in Chinese Application No. 201980039923.9 dated Oct. 27, 2023 (10 pages).

English translation of Chinese-language Office Action issued in Chinese Application No. 201980039923.9 dated Mar. 23, 2024 (11 pages).

* cited by examiner

OPERATING UNIT OF A VEHICLE

BACKGROUND AND SUMMARY OF THE INVENTION

The present disclosure relates to a touch-sensitive operating unit of a vehicle. This disclosure also relates to a vehicle which has the operating unit.

There are various operating units in vehicles, which can be operated by the occupants in order to control functions of the vehicle, for example the entertainment system. Such operating units may have touch-sensitive input layers (touchpads), has and may have an operating unit with a touchpad.

It is an object of the present disclosure to provide an operating unit of a vehicle, which allows reliable and user-friendly operation of functions of the vehicle with a visually attractive design.

This and other objects are achieved by the inventive operating unit of a vehicle disclosed herein. The vehicle is, in particular, a road vehicle. The operating unit is preferably installed in a fixed fashion in the vehicle, and is for example located in the central console between the driver's seat and the passenger's seat.

The operating unit comprises an operating element. The operating element in turn comprises a glass body. The glass body is preferably in the form of a sheet. An upper side is defined on the glass body. This upper side forms the visible and touchable surface of the operating element. The surface may therefore be touched by a finger of a user in the vehicle. There is a lower side opposite the upper side of the glass body.

The operating element furthermore comprises a touch-sensitive input layer on the lower side of the glass body. This touch-sensitive input layer is, in particular, configured as a touch-sheet. The touch-sensitive input layer is particularly preferably configured for the capacitive detection of an object, in particular a finger, on the surface of the glass body. The touch-sensitive input layer preferably extends over at least 50%, particularly preferably over at least 70%, of the area of the lower side of the glass body.

The operating element furthermore comprises an intermediate layer. The intermediate layer is configured to be electrically nonconductive and is located between the lower side of the glass body and the input layer. Because of the nonconductive configuration of the intermediate layer, it does not interfere with the capacitive detection of the touch on the surface of the glass body by the input layer arranged below the intermediate layer. Preferably, the intermediate layer extends over at least the same area as the input layer. The intermediate layer makes it possible to configure the appearance of the operating element, in particular of the glass body, independently of the input layer. In particular, the intermediate layer is nontransparent.

The operating unit furthermore comprises a base. The base is, in particular, configured for fixed mounting in the vehicle. The operating element is mounted on the base.

The operating unit preferably comprises an electronics unit. The electronics unit is particularly preferably located in the base. The electronics unit is electrically conductively connected to the touch-sensitive input layer and is used to evaluate, and/or forward to a superordinate control unit, the touches detected by means of the input layer.

Furthermore, the intermediate layer preferably has a reflection factor of at least 20%, preferably at least 25%, particularly preferably at least 30%, on its side facing toward the glass body. Because of this relatively high reflection factor, the color of the preferably lustrous intermediate layer is a dominant factor for the appearance of the glass body, and therefore of the operating element as a whole.

The reflection factor preferably describes how much light is reflected by a surface. In particular, the surface power density is in this case measured, for example in $W/m^2$.

It is furthermore preferable for the intermediate layer to have a specific surface resistance of at least 20 V/A (or Ω), preferably at least 25 V/A, particularly preferably at least 30 V/A, on its side facing toward the glass body and/or on the opposite side. This ensures that the intermediate layer has almost no effect on the detection accuracy of the input layer.

The specific surface resistance is preferably defined as follows: the surface resistance is defined as the ratio of an electrical voltage applied between two electrodes and the current measured between these electrodes, the two electrodes being placed on the same area. The surface to be tested is, in particular, flat and plane-parallel. The two concentric annular plate electrodes are placed on said area. The resistance is determined for a predetermined voltage, the value of which must lie below the breakdown voltage (in air) in relation to the spacing of the electrodes, and a constant current. In order to determine the specific surface resistance, the surface resistance is to be multiplied by the ratio of the effective circumference and the distance of the ring electrode from the inner electrode.

It is furthermore preferable for the intermediate layer to have metallic optics on its side facing toward the glass body. As described above, to this end the intermediate layer preferably has a relatively high reflection factor. In addition or as an alternative, these metallic optics may be achieved by the corresponding color selection, for example silver or light gray.

The intermediate layer may be composed of a plurality of individual layers. Preferably, at least one individual layer of metal oxide is used.

The intermediate layer is particularly preferably configured as a coating. This coating is applied onto the lower side of the glass body. A nonconductive vacuum metallization (NCVM) coating is particularly preferably used in this case.

The nonconductive vacuum metallization coating particularly preferably has the following individual layers:
titanium oxide layer ($TiO_2$) and/or
silicon-aluminum layer (SiAl) and/or
metal oxide layer.

In particular, the titanium oxide layer is located directly on the glass body. The silicon-aluminum layer is preferably located between the titanium oxide layer and the cover layer of metal oxide. The silicon-aluminum layer preferably comprises silicon in a proportion of from 80% to 95% by weight.

It is furthermore preferable for the glass body to have a light transmission of at least 50%, preferably at least 75%, particularly preferably at least 90%, in the visible spectrum. The effect achieved by this light transmission of the glass body is that the appearance of the glass body is substantially determined by the underlying intermediate layer.

In order to determine the light transmission of the glass body, the surface power density of visible light is preferably measured, for example in $W/m^2$, particularly in the spectrum of from 380 nm to 640 nm.

The glass body is preferably made of glass, in particular silicate glass. It is preferably not a plastic body.

In particular, the glass body is cast or pressed as a single part, in particular from glass.

The operating element particularly preferably has only the elements described here, namely glass body, intermediate layer and input layer. In particular, a display for the electronic representation of images or colors is preferably not provided.

It is furthermore preferable for the operating element to be rotatable and/or pressable and/or displaceable relative to the base. In particular, to this end an axis, which is for example perpendicular to the surface of the glass body, is defined. The rotation takes place about this axis. The pressing takes place parallel to the axis. The displacement takes place perpendicularly to the axis.

The operating unit is preferably configured to detect, and forward to a control unit, the rotation and/or pressing and/or displacement. Particularly preferably, the electronics unit described above is configured to detect and evaluate, and/or forward, precisely these movements of the operating element relative to the base.

This disclosure furthermore relates to a vehicle. The vehicle contains the described operating unit in the installed state. The operating unit is preferably connected in the vehicle for data transmission to a superordinate control device.

Further details, features and advantages of the embodiments in this disclosure may be found from the following description and the figures, in which:

DETAILED DESCRIPTION OF THE DRAWINGS

Figure 2:
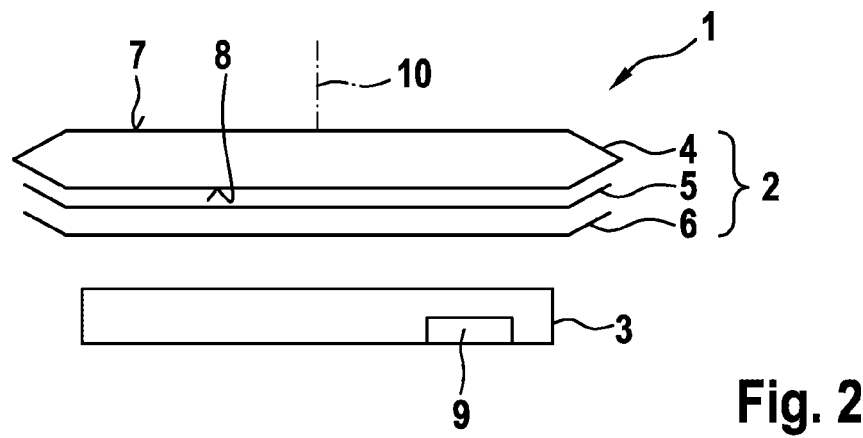
FIG. 2 shows a schematic exploded representation of the operating unit.
Figure 3:
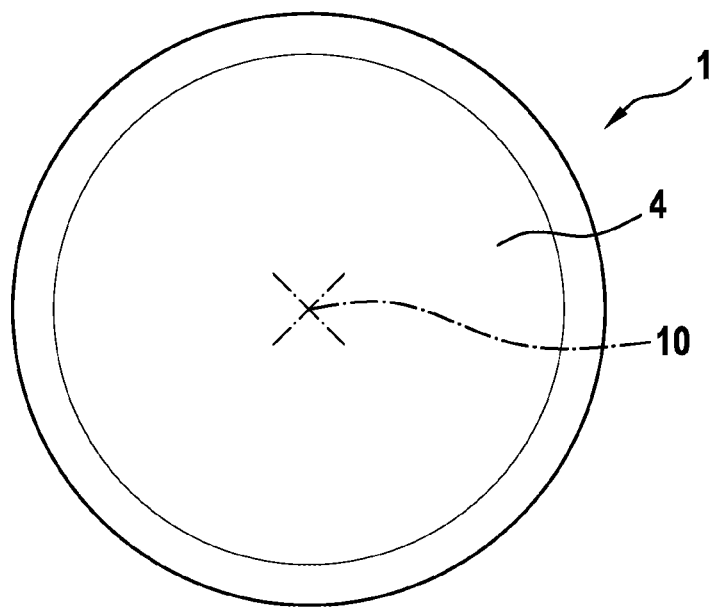
FIG. 3 shows a plan view of the operating unit.

An operating unit 1, which is used in a vehicle in a state installed in a fixed fashion, will be described below with the aid of FIGS. 1 to 3.

Figure 1:
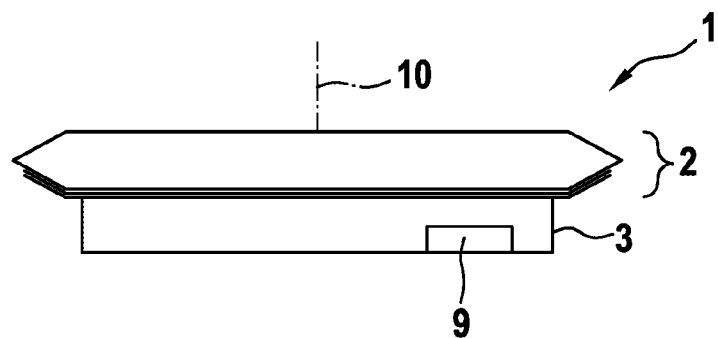
FIG. 1 shows a schematic side view of the operating unit.

FIG. 1 shows a schematic side view of the operating unit 1. FIG. 2 shows a schematic exploded representation and FIG. 3 shows a plan view of the operating unit 1. Reference will be made below to FIGS. 1 to 3.

The operating unit 1 comprises an operating element 2. The operating element 2 is composed of a glass body 4, an input layer 6 and an intermediate layer 5. The intermediate layer 5 is located between the glass body 4 and the input layer 6. The intermediate layer 5 is, in particular, configured as a coating on the glass body 4.

An upper side 7 is defined on the glass body 4. This upper side 7 forms the touchable surface of the operating element. Opposite the upper side 7, there is a lower side 8. The intermediate layer 5 is applied, preferably as a coating, on this lower side 8.

An axis 10 is defined perpendicularly to the upper side 7.

The individual parts of the operating element 2, in particular the glass body 4, the intermediate layer 5 and the input layer 6, are preferably connected, in particular adhesively bonded, to one another in a fixed fashion.

Besides the operating element 2, the operating unit 1 comprises a base 3. The base 3 is installed in a fixed fashion in the vehicle. The base 3 is used to receive, or mount, the operating element 2.

Particularly preferably, the operating element 2 is rotatable about the axis 10 and/or displaceable perpendicularly to the axis 10 and/or pressable parallel to the axis 10, relative to the base 3.

Operating inputs by a user are detected by means of the input layer 6 and optional sensors for detecting the movement of the operating element 2 relative to the base 3. These operating inputs are evaluated and/or forwarded by means of an electronics unit 9. The electronics unit 9 is preferably located in the base 3.

The operating unit 1, in particular the operating element 2 and its elements, glass body 4, intermediate layer 5 and input layer 6, are preferably configured as described in the general part of the description.

LIST OF REFERENCES 1 operating unit
2 operating element
3 base
4 glass body
5 intermediate layer
6 input layer
7 upper side
8 lower side
9 electronics unit
10 axis

What is claimed is:

1. An operating unit of a vehicle, comprising:
an operating element having
a glass body which has an upper side which forms a visible and touchable surface of the operating element, and a lower side opposite the upper side,
a touch-sensitive input layer on the lower side of the glass body, which is configured to detect a touch on the upper side of the glass body,
an electrically nonconductive intermediate layer between the lower side of the glass body and the input layer, and
a base on which the operating element is mounted,
wherein the electrically nonconductive intermediate layer has a reflection factor of between at least 20% and at least 30%, on its side facing toward the glass body.

2. The operating unit according to claim 1, wherein the intermediate layer has a specific surface resistance of between at least 20 Ω and at least 30 Ω, on its side facing toward the glass body and/or on the opposite side.

3. The operating unit according to claim 2, wherein the intermediate layer has metallic optics on its side facing toward the glass body.

4. The operating unit according to claim 3, wherein the intermediate layer has at least one individual layer of metal oxide.

5. The operating unit according to claim 4, wherein the intermediate layer is applied as a coating, comprising a nonconductive vacuum metallization coating, on the lower side of the glass body.

6. The operating unit according to claim 5, wherein the glass body has a light transmission of between at least 50% and at least 90%, in the visible spectrum.

7. The operating unit according to claim 6, wherein the glass body is made of glass comprising silicate glass.

8. The operating unit according to claim 7, wherein the operating element is rotatable and/or pressable and/or displaceable relative to the base.

9. A vehicle comprising an operating unit according to claim 8 installed in the vehicle.

10. The operating unit according to claim 1, wherein the electrically nonconductive intermediate layer has metallic optics on its side facing toward the glass body.

11. The operating unit according to claim 10, wherein the metallic optics are achieved via color selection.

12. The operating unit according to claim 11, wherein the color selection is silver or light gray.

* * * * *